United States Patent [19]

Reed et al.

[11] Patent Number: 4,590,791
[45] Date of Patent: May 27, 1986

[54] SELF CALIBRATING PRESSURE TRANSDUCER

[75] Inventors: Charles J. Reed, Palm Harbor; Henry R. Heit, Clearwater, both of Fla.

[73] Assignee: Ametek, Inc., New York, N.Y.

[21] Appl. No.: 544,386

[22] Filed: Oct. 21, 1983

[51] Int. Cl.$^4$ ............................................. G01L 27/00
[52] U.S. Cl. .................................................. 73/4 R
[58] Field of Search ......................... 73/4 R, 1 R, 756; 364/571, 573

[56] References Cited

U.S. PATENT DOCUMENTS

| | | | |
|---|---|---|---|
| 2,478,938 | 8/1949 | Osterhus | 73/4 R |
| 2,818,726 | 1/1958 | Amonette et al. | |
| 3,077,102 | 2/1963 | Greer et al. | 73/4 R |
| 3,585,841 | 6/1971 | Brandau | 73/4 R |
| 3,657,926 | 4/1972 | Munson et al. | |
| 3,689,748 | 9/1972 | Bothne | |
| 3,777,546 | 12/1973 | Rollins | 73/756 X |
| 4,051,712 | 10/1977 | Zias et al. | 73/4 R |
| 4,084,239 | 4/1978 | Anastasia et al. | 364/571 |
| 4,086,804 | 5/1978 | Ruby | 73/4 R |
| 4,192,005 | 3/1980 | Kurtz | 364/571 |
| 4,339,943 | 7/1982 | Hedrick | 73/4 R |
| 4,446,715 | 5/1984 | Bailey | 73/1 R |

OTHER PUBLICATIONS

U.S. Science Corp., Universal Dynamic Pressure Test Equipment, 1959 brochure.

Primary Examiner—Jerry W. Myracle
Assistant Examiner—Hezron E. Williams

[57] ABSTRACT

A testing and measuring apparatus and method is described for determining the accuracy of pressure transducers under test and for accurately measuring the pressure of a fluid. Accurate calibration of a referenced pressure transducer and automatic correction of the output signal produced by the reference transducer are features of the system. Specifically, the test system includes a reference pressure transducer, input and output fluid ports, solenoid control valves, a microcomputer and a key pad. Input to the reference pressure transducer is coupled to the solenoid control valves which are respectively coupled to the pressure standard, to atmosphere and to the input and output fluid ports. The output of the reference pressure transducer is coupled to a microcomputer programmed to automatically correct the output signal from the reference pressure transducer for certain predetermined inaccuracies and is also preferably programmed to control the operation of the solenoid control valves.

2 Claims, 5 Drawing Figures

SELF CALIBRATING PRESSURE TRANSDUCER

DESCRIPTION OF THE INVENTION

The invention relates to testing and measurement method and apparatus for determining the accuracy of pressure transducers under test and for accurately measuring the pressure of a fluid and, in particular, to such testing and measurement method and apparatus using a highly accurately calibrated reference pressure transducer.

Pressure transducers which convert an input pressure to an electrical output signal which in turn activate a display to provide an indication of the measured pressure are subject to many inaccuracies. Since these inaccuracies affect the accuracy of the pressure measurements, it is essential to provide compensation or correction to insure accurate measurements. Accuracy is particularly important where such pressure transducer is to be used as a reference pressure transducer in a testing and measurement system for calibrating the accuracy of other pressure transducers prior to using such pressure transducers in any of their known wide variety of applications.

An example of a system which attempts to achieve more accuracy in a pressure transducer is found in U.S. Pat. No. 4,051,712 in which the pressure transducer is coupled to a single source of reference pressure to calibrate the pressure transducer at atmospheric pressure. Such method of calibration may not accurately provide measurement at other portions of the intended range of use for the pressure transducer, for example, mid-range or full range, and does not provide compensation or correction for inaccuracies related to linearity, gain, drift and other instabilities in the transducer measurements.

Accordingly, it is one object of the invention to provide a method and apparatus for accurate calibration of a pressure transducer. More particularly, it is an object of the invention to provide an accurate reference pressure transducer for use in testing the accuracy of other pressure transducers.

It is a further object of the invention to calibrate a reference pressure transducer by subjecting the reference pressure transducer to fluid having controlled pressure within the range of response of the reference pressure transducer. More specifically, it is an object of this invention to provide a reference pressure transducer which can be calibrated at atmospheric pressure and at full scale reading of the reference pressure transducer.

Still further, it is an object of the invention to automatically correct the output electric signal produced by a reference pressure transducer to provide increased accuracy of pressure measurement from such transducer.

It is a further object of this invention to provide a system for testing pressure transducers in which a reference pressure transducer is accurately calibrated and thereafter used to determine the accuracy of the pressure measurements of the pressure transducers under test.

Still further, it is an object of this invention to provide a test system which can provide highly accurate measurement of the pressure of a fluid located at a location remote from the test system.

These and other objects and features of the invention are achieved in accordance with the invention by providing accurate calibration of a reference pressure transducer, automatic correction of the output signal produced by such reference pressure transducer and the use of such accurately calibrated reference pressure transducer for determining the accuracy of pressure transducers under test and for accurately measuring pressure of a fluid at a location remote from the reference pressure transducer. The reference pressure transducer is calibrated by subjecting the transducer to fluid pressures at various points in its intended range of use. For example, one calibration takes place at atmospheric pressure by venting the reference pressure transducer to the atmosphere. Additional calibration takes place at full scale by subjecting the reference pressure transducer to known precisely controlled fluid pressure produced by a pressure standard. To provide greater accuracy to the measurement provided by the reference pressure transducer, the output signal from the reference pressure transducer is corrected prior to displaying the measured value of pressure on a display. Specific corrections applied to the output signals from the reference pressure transducer are for zero offset, gain correction and linearity.

In a specific embodiment of the invention, a test system includes a reference pressure transducer, input and output fluid ports, solenoid controlled valves, a microcomputer and a key pad. The input to the reference pressure transducer is coupled to the solenoid controlled valves which are respectively coupled to the pressure standard, to atmosphere, and to the input and output fluid ports. The output of the reference pressure transducer is coupled to a microcomputer which is programmed to automatically correct the output signal from the reference pressure transducer for predetermined inaccuracies and is preferably also programmed to control the operation of the solenoid controlled valves. The key pad is used to enter commands into the microcomputer. A display is coupled to the output of the microcomputer for displaying the accurately measured fluid pressure.

To calibrate the reference pressure transducer, an appropriate command is entered into the microcomputer which produces a signal which causes the solenoid controlled valve coupling the input of the reference pressure transducer and atmosphere to close, thereby applying atmospheric pressure to the reference pressure transducer. The output of the reference pressure transducer is corrected and a reading of zero appears on the display. Next, an appropriate command is entered into the microcomputer which produces a signal which causes the solenoid control value coupling the input of the reference pressure transducer with the pressure standard to open, thereby applying a known accurately controlled fluid pressure to the input of the reference pressure transducer. The output of the reference pressure transducer corrected for inaccuracies by the microcomputer is displayed on the display.

To test a pressure transducer, the pressure transducer to be tested is coupled to an output port of the test system. A source of fluid pressure, which can be a fixed fluid supply or a portable supply such as a hand operated pump, is applied to the pressure transducer under test and to a solenoid controlled valve which in turn is coupled to the input of the reference pressure transducer. An appropriate command is entered into the microcomputer which produces a signal which causes the solenoid controlled valve to open coupling the source of fluid pressure to the input of the reference transducer. The fluid pressure sensed by the reference pressure transducer is displayed on the display and compared with the pressure reading of the pressure transducer under test to determine the accuracy of the pressure transducer under test.

Pressure of a fluid remote from the test system can be accurately measured by coupling the fluid to an input port of the test system, which input port is coupled through a solenoid controlled valve to the input of the reference pressure transducer. An appropriate command entered into the microcomputer causes the solenoid controlled valve to open coupling the fluid to the reference pressure transducer. The display provides an accurate measurement of the fluid pressure. The difference in pressure between two sources of fluid can also be measured using the test system.

These and other objects and features of the invention will be more fully understood and appreciated by reference to the following detailed description of a presently preferred embodiment of the invention taken together with the drawings, in which.

Figure 1:
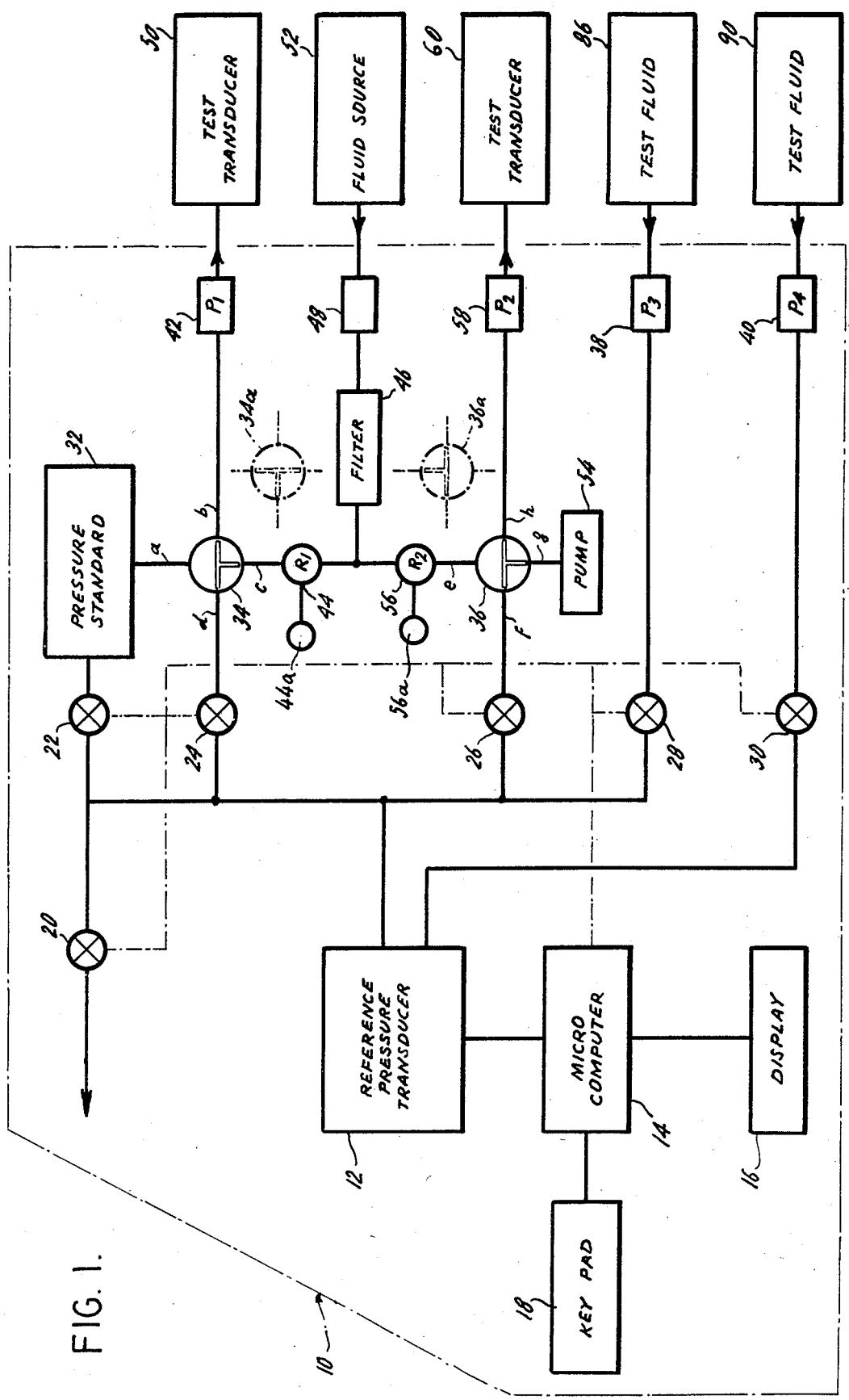
FIG. 1 is a schematic block diagram of the test system.

Referring to FIG. 1, the test system which is referred to generally as reference numeral 10, includes a reference pressure transducer 12 which responds to fluid pressure applied to its inputs and produces an analog electrical voltage signal output representative of the pressure of the input fluid. The analog electrical output signal is applied to the input of microcomputer 14 where it is corrected for inaccuracies, as will be explained in greater detail below. The output from microcomputer 14 is applied to display 16 which provides a visual indication of the input fluid pressure. Key pad 18 is coupled to microcomputer 14 to control various aspects of the operation of the test system 10, as will be explained below. One function of the keypad is to permit the system user to select for display on display 16 a pressure measurement in one of a number of selectable pressure systems, such as inches of water, pounds per square inch (psi) or kilopascals (KPA).

The fluid input to the reference pressure transducer 12 can be applied through a number of valves, preferably solenoid controlled valves which can be automatically operated in response to signals from microcomputer 14. In the embodiment shown in FIG. 1, solenoid controlled valves 20, 22, 24, 26, 28 and 30 are used. In general, the function of solenoid control valves 20 through 30 are as follows. Solenoid controlled valve 20 permits the input to reference transducer 12 to be coupled to atmospheric pressure. Solenoid controlled valve 22 permits the input to reference transducer to be coupled to the output of pressure standard 32, such as the pressure standard described in U.S. Pat. No. 3,047,005 issued July 31, 1962 to Robert J. Karr and entitled "Pressure Regulator", which produces a known constant output fluid pressure. Since the pressure standard 32 depends upon "dead weights" to generate a known pressure, local attraction of gravity must be taken into consideration for accurate measurement. This is done by setting the local gravity into microcomputer 14. This corrects the output of the pressure standard 32 to eliminate any errors generated by changing geographical locations. Solenoid controlled valve 24 couples the input to reference pressure transducer 12 to output, d, of first valve 34. Solenoid controlled valve 26 permits the input to reference pressure transducer 12 to be coupled to output, f, of hand operated value 36. Solenoid controlled valve 28 permits the input of reference pressure transducer 12 to be coupled to first fluid input port 38 and valve 30 permits the input to reference pressure transducer 12 to be coupled to second fluid input port 40.

Valve 34 has an output, a, coupled to pressure standard 32, an output, b, coupled to first fluid output port 42 and an input, c, coupled to the output of pressure regulator 44 which is conventional and provides for continuous adjustment of output pressure in a fixed range, for example, 0–30 psi. The pressure established by pressure regulator 44 is read out on pressure gauge 44a. Valve 34 has two operative positions. In the operative position one, shown dotted line as 34a, input, c, is coupled to outputs, a, and d, so that any fluid applied to input, c, is applied to the input to pressure standard 32. The first operative position is used for calibrating reference pressure transducer 12 as will be explained below. In operative position two, shown full line, input c, coupled to outputs, d, and, b, and fluid applied to input, c, applied to valve 24 and fluid output port 42, test system 10 is used to determine the accuracy of a test transducer 50 coupled to fluid port 42 as will be explained below.

Valve 36 has an input, g, coupled to hand operated pump 54, such as a squeeze ball. Providing the hand operated pump permits test system 10 to be completely portable and capable of use without the necessity of an external source of fluid, as will be explained below. Valve 36 also has an input, e, coupled to a conventional pressure regulator 56 which may be identical to pressure regulator 44. The pressure established by pressure regulator 56 is read on pressure gauge 56a. The outputs, f, and, h, of value 36 are coupled respectively to the input of solenoid controlled valve 26 and fluid output port 58. Valve 36 has two operative positions. In operative position one, shown dotted line as 36a, input, e, is coupled to outputs, f, and, h, and the accuracy of a test transducer 60 coupled to output port 58 is tested as will using an external fluid source 52 as will be explained below. In operative position two, shown full line, input, g, is coupled to outputs, f, and, h, and the accuracy of the test transducer 60 is tested using hand operated pump 54.

The operation of the test system 10 is generally as follows.

First there is the "power-up" mode. Power is turned "on" at switch 108. A "clear" and then an "enter" button are pushed on key pad 18. Signals are input to microcomputer 14 which causes valve 20 to open, venting reference pressure transducer 12 to atmosphere, for example, for two seconds. The number 00.000 appears on the display.

In the "measurement" mode, a reset button on keypad 18 is first pushed causing all of valves 20 through 30 to be turned "off". Local gravity correction is applied to microcomputer 14 to compensate for the standard pressure value being generated in a location other than where the calibration standard was calibrated. Particular desired functions such as calibrate, or reading pressure of fluid at a selected port, are selected by pushing appropriate buttons of key pad 18. A button on key pad 18 is pushed to select the desired measurement units to be displayed. In addition, valve 34 and/or 36 are set as are pressure regulators 44 and/or 56. An "enter" switch is pushed on key pad 18. Thereafter, reference pressure transducer 12 is vented to atmosphere by operation of valve 20 and thereafter the desired measurement is displayed on display 16. Each measurement operation is always preceeded by venting of reference transducer 12 to atmosphere.

In a particular operation, a fluid pressure source 52 is coupled to fluid input port 48. One or more test transducers 50 and/or 80 are coupled respectively to fluid output ports 42 and/or 58. Power is applied to the test system 10 and "enter" and "clear" buttons on keypad 18 ae pushed. Signals are thereby input to microcomputer 14 which produces a signal opening valve 20 venting reference pressure transducer 12 to atmosphere. The display reads 00.00. Next, test system 10 is calibrated at a known pressure, such as full scale reading. To this end, valve 34 is placed in position one, regulator 44 is adjusted for full scale, as indicated in gauge 44a, and a "calibrate" button is pushed on key pad 18. Valve 22 is opened coupling the output of pressure standard 32 to the input of reference pressure transducer 12. The input to pressure transducer 32 is from fluid source 52 via air filter 46, regulator 44 and ports, c, a, of valve 34. The display 16 reads the pressure produced by standard pressure source 32.

Figure 2:
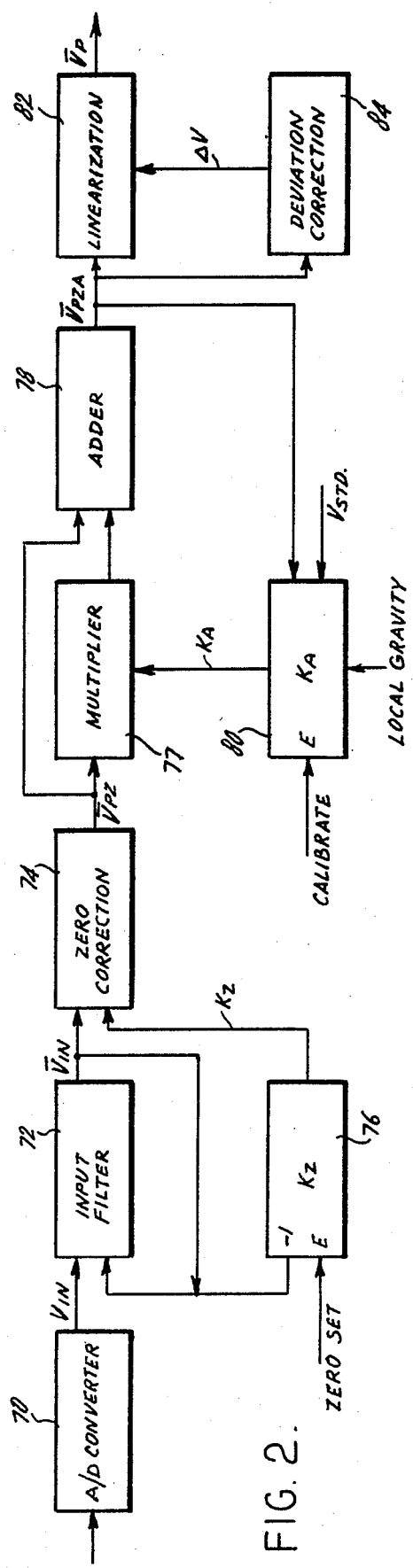
FIG. 2 is a block diagram illustrative of the operation of a portion of the microcomputer which corrects the output signal of the reference pressure transducer.

As stated above, microcomputer 14 automatically corrects the output signal from transducer 12 for errors as will now be explained with reference to FIG. 2 which shows the signal correction portion of microcomputer 14 in block diagram form. The input to microcomputer 14 which is an analog electrical signal output from reference pressure transducer 12 is first applied to an analog-to-digital converter 70 to convert the analog signal to digital signal, $V_{IN}$. The digital signal is applied to an input filter 72 which smoothes the signal and produces an output signal, $\overline{V_{IN}}$, which output signal is fed back to the input of filter 72. The smoothing function of filter 72 is carried out in accordance with the following:

$$\frac{V_{IN} - \overline{V_{IN}}}{n} + \overline{V_{IN}}$$

where n=sample size.

Figure 3:
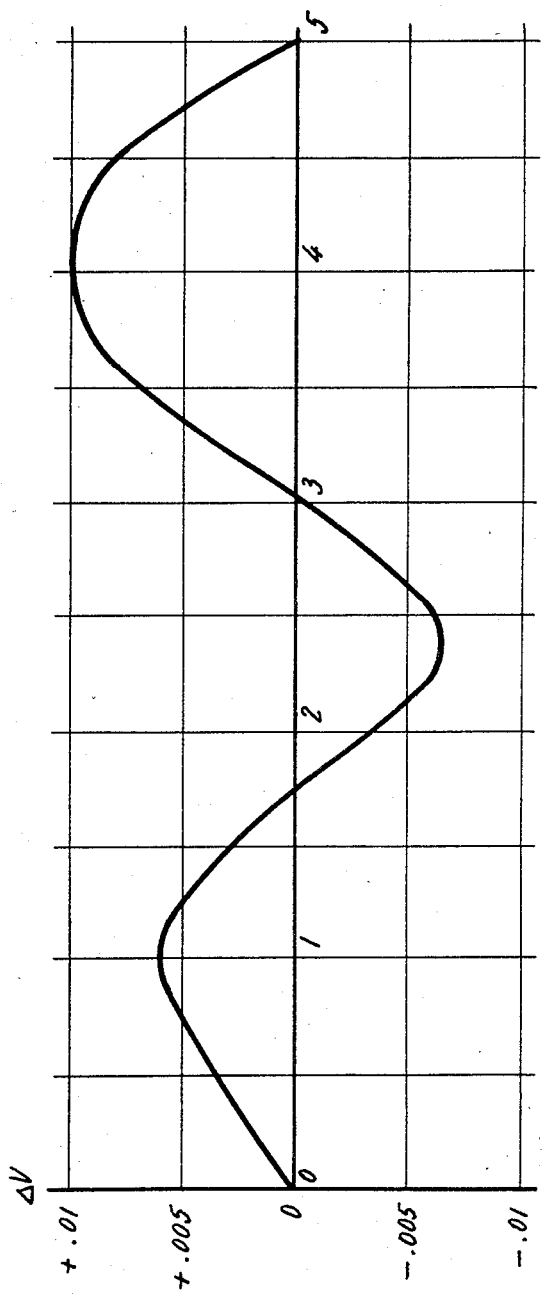
FIG. 3 is a graph showing in the deviation curve of the displayed reading versus the standard input which is used as one of the corrections applied to the output signal from the reference pressure transducer.

The output, $\overline{V_{IN}}$, of input filter 72 is applied to zero correction circuit 74. The other input to zero correction circuit 74 is zero offset constant $K_z$ which is produced in zero constant generating circuit 76 as follows. When test system 10 is initially vented to atmosphere, an enable signal is applied to the "E" input to zero constant generating cirucit 76. The other input is $\overline{V_{IN}}$ which is applied to the inverting input of circuit 76. A zero offset correction constant, $K_z$, is thereby produced. The zero offset constant, $K_z$, is added to the output filter 72 in zero correction circuit 74 to produce a zero corrected signal $\overline{V}_{PZ}$. This zero offset constant $K_z$ is retained and applied to future measurements. Next, the zero corrected signal $\overline{V}_{PZ}$ is corrected for gain in multiplier 77, adder 78 and gain constant circuit 80. Local gravity is applied to gain constant circuit 80 to correct for local gravity conditions. Gain constant circuit responds to calibration standard signal $V_{STD}$ and the output gain corrected value signal $\overline{V}_{PZ}$ from adder 78 when the gain constant circuit is enabled by the application of the "calibrate" signal to the enable input, E, when the test system 10 is in the calibrating mode and the fluid pressure applied to reference pressure transducer 12 is from pressure standard 32. Multiplier 77 multiplies the zero corrected value $\overline{V}_{PZ}$ by the gain corrected constant $K_A$ which signal is added to the zero correct signal $\overline{V}_{PZ}$ in adder 78 to produce the gain corrected value signal $\overline{V_{PZA}}$ which is equal to $\overline{V}_{PZ}(1+K_A)$. For example, stored in microcomputer 14 is information that for an input pressure of 30 psi, $\overline{V_{PZA}}$ should be five volts. If test system 10 is being calibrated at 30 psi, and $\overline{V_{PZA}}$ does not equal five volts, the correction factor $K_A$ is determined to cause $\overline{V_{PZA}}$ to equal five volts. Finally, the gain corrected signal $\overline{V_{PZA}}$ is applied to linearization circuit 82 and to deviation correction circuit 84. Deviation correction circuit 84 is a ROM in which voltage deviation for standard inputs of reference pressure transducer 12 are stored. A typical deviation correction curve is shown in FIG. 3 in which the ordinate shows the deviation correction to be applied, $\Delta V$, and the ABSCISSA shows the voltage. Thus, for example, at a $2\frac{1}{2}$ volt reading, a deviation correction of $-0.006$ would be required to be applied to the gain corrected value $V_{PZA}$. The deviation correction $\Delta V$ is added to the gain control signal $V_{PZA}$ in linearization circuit 82 and the output $V_P$ is displayed on display 16.

Test system 10 can be used to test the accuracy of test transducers 50 or 60 coupled respectively to fluid output ports 42, 58. For example, to test test transducer 50, valve 34 is rotated to position two wherein ports, b, c, and d, are connected together. Fluid from fluid source 52 flows through regulator 44 and valve 34 and via ports, c, d, of valve 34 to the input of solenoid controlled valve 24. A switch designating the desired units to be displayed is pushed on key pad 18 causing signals to be applied to microcomputer 14 which first causes valve 20 to operate venting reference transducer 12 for a predetermined time, for example 2 seconds. Valve 20 then is closed and valve 24 opened applying the fluid to the input of pressure transducer 12. The output of pressure transducer 12 is applied to the input of microcomputer 14 wherein the signal is corrected as described above and the pressure displayed on display 16. By comparison of the displayed pressure with the pressure read by test transducer 50, an indication of the accuracy of test transducer 50 is obtained.

The accuracy of test transducer 60 connected to output port 58 is determined in a similar manner. Valve 36 is placed in position one so that fluid source 52 applies fluid via regulator 56 to test transducer 60 and valve 26. An appropriate switch on key pad 18 is pushed and the pressure is displayed on display 16 and compared to the reading of test transducer 60 to determine the accuracy of test transducer 60.

Test system 10 is also portable and can use a locally produced fluid supply produced by hand pump 54. To this end, valve 36 is placed in position two and test transducer 60 is connected to port 58. Pump 54 is squeezed to produce a fluid under pressure which is applied to test transducer 60 and valve 26. Operation of valve 26 through the appropriate input commands to microcomputer 14, produces a reading of the fluid pressure on display 16 which is compared to the reading of test transducer 60.

Test system 10 can be used to measure the absolute pressure of fluid by connecting the fluid under test 86 to input port 38 and valve 28, and a source of vacuum 90 to input port 40 and valve 30. Pushing the appropriate switch on keypad 18 produces input signals to microcomputer 14 which closes valve 20 and operates valves 28 and 30, connecting the test fluid and vacuum to the inputs of pressure transducer 12. The output of pressure transducer 12 is applied to microcomputer 14 wherein the output signal is corrected and accurate value of the pressure of test fluid 86 is displayed on display 16.

The test system 10 can also be used as a differential pressure measurement system by connecting a test fluid 90 to input port 40 and valve 30 and a test fluid 86 to input port 38 and valve 28. In this configuration, microcomputer 14 receives signals from keypad 18 which causes both valves 28 and 30 to open. The pressure of both test fluids 86 and 90 are applied to reference pressure transducer 12 in a differential mode. The difference in the pressure is thus displayed on display 16.

Figure 4:
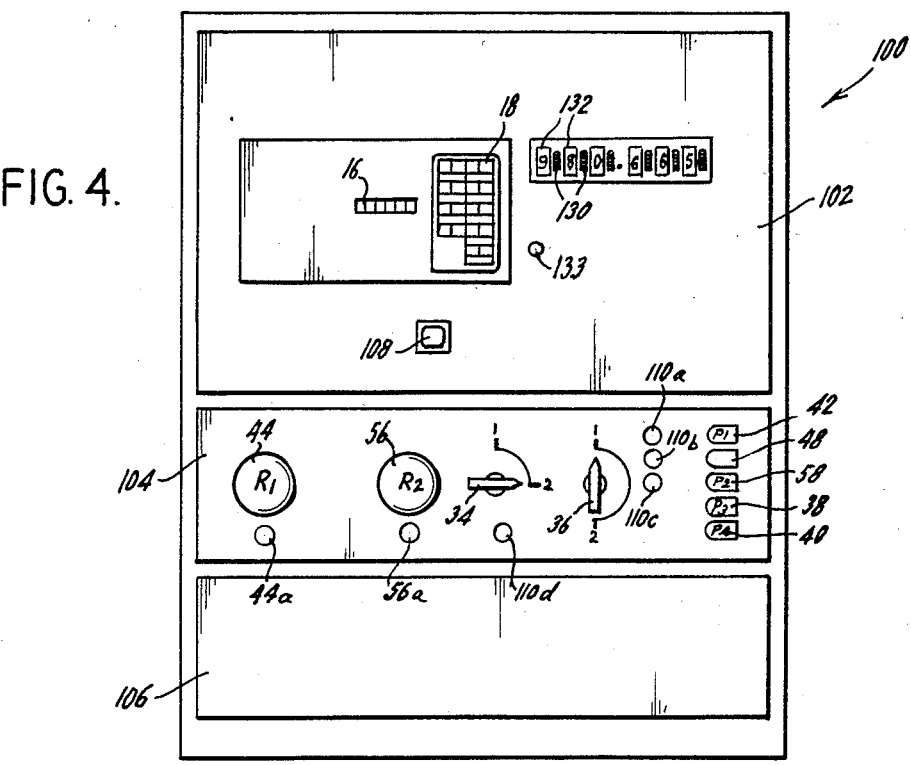
FIG. 4 is an elevational view showing the front panel of the test system.
Figure 5:
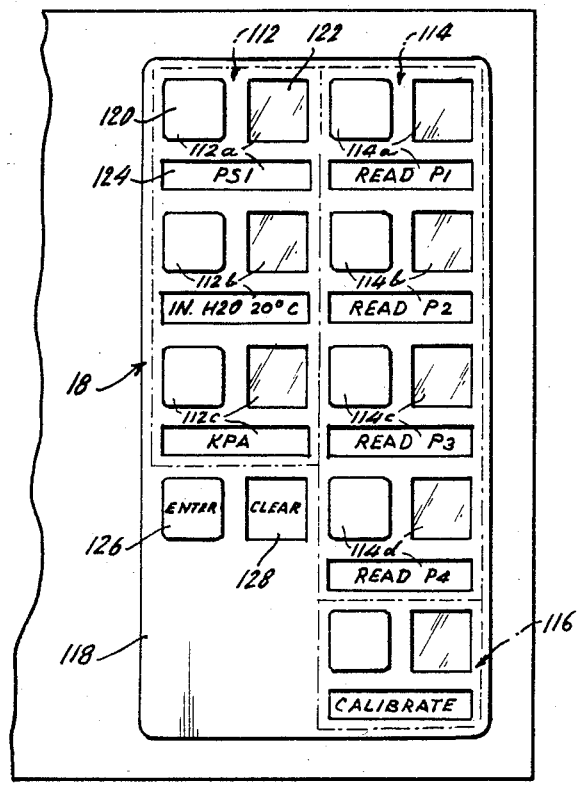
FIG. 5 is an enlarged view of the keypad mounted on the front panel of the test system.

Referring now to FIGS. 4 and 5, test system 10 is housed in a cabinet 100 including three panels 102, 104 and 106. Mounted on panel 102 is key pad 18 and display 16 which can be of conventional design and compatible with microcomputer 14. An "on-off" switch 108 is mounted on panel 102. Local gravity is set by adjustible thumb switches 130 and corresponding digital indicators 132 mounted on panel 102. Mounted on the central panel 104 are pressure regulators 44 and 56, the rotatable handles of which are visible on the outside of panel 104. Valve 34 and 36 are also mounted on panel 104. Positions one and two for each valve 34, 36 are indicated on panel 102. Light emitting diodes 110a, 110b, 110c and 110d indicate various conditions of the test system 10. Ports 42, 48, 56, 38 and 40 are also mounted on panel 104. Panel 106 is an access panel, permitting access to the inside of testing system 10. The remaining components of testing system 10 are mounted inside the cabinet 100 in a conventional manner and are not shown.

Referring to FIG. 5, the keypad 18 is shown in greater detail. Key pad 18 is functionally divided into four sections, 112, 114, 116 and 118. Section 112 is a units control section, section 114 is the pressure testing control section, section 116 is the calibrate control section and section 118 is the function control section. Each section 112, 114 and 116 includes a push button switch 120, a lamp 122 which lights when the corresponding push button switch is pushed, and a legend 124 to indicate the function of the particular switch. Function control section 118 includes enter and clear push buttons 126, 128.

Unit control section 112 is divided into three subsections 112a, 112b and 112c which are used to control the particular units of pressure displayed on display 16. Thus, pushing the switch in subsection 112a causes the display to read in psi; the switch in subsection 112b causes the display to read in inches of water at 20° C.; and the switch in subsection 112c causes the display to read in kilopascals. Subsections 114a, 114b, 114c and 114d of section 114 control the selection of the solenoid control valves which couple ports 42 (read P1), 58 (Read P2), 38 (Read P3 and 40 (Read P4), respectively, to the reference pressure transducer 12 for a particular test. For example, pushing button 114a causes valve 24 (FIG. 1) to open and the fluid pressure of the fluid applied to port 42 (P1) to be displayed on display 16. Thus, to make a complete measurement, a switch from section 112 is depressed to select the particular unit for display and a switch from section 114 is depressed to select the particular input port for test and thereafter "enter" button 126 is pushed. The test system 10 is reset by pushing the "reset" and "clear" buttons.

The calibrate section 116 includes a switch which permits selection of the calibrate function to calibrate the reference pressure transducer using pressure standard 32 as described above.

While what has been described is the presently preferred embodiment of the invention, modifications or changes can be made without departing from the spirit and scope of the invention as set forth in the appended claims.

What is claimed is:

1. A system for determining the accuracy of pressure transducers under test, including a fluid port adapted to be coupled to a transducer under test, a source of accurately controlled fluid pressure, reference pressure transducer means including a microcomputer and a reference pressure transducer for producing an output signal representative of fluid pressure, means for coupling said output signal to said microcomputer to automatically correct the output signal from the reference pressure transducer, control means coupled to and under the control of said microcomputer for selectively coupling said reference pressure transducer means to said source of accurately controlled fluid pressure to said test transducer and to atmospheric pressure, and means for applying a source of fluid pressure selectively to said test transducer and said reference pressure transducer to determine the accuracy of the test transducer, said microcomputer including means for selectively adjusting the local gravity of said source of accurately controlled fluid pressure.

2. A system for testing the accuracy of a plurality of pressure transducers and for accurately measuring the pressure of fluids, comprising a first output port adapted to be coupled to a first pressure transducer, a first input port for receiving pressure from a pressure source;

a second output port adapted to be coupled to a second pressure transducer, a second input port adapted to be coupled to a test fluid;

a third input port adapted to be coupled to a test fluid;

a source of reference pressure;

reference pressure transducer means including a reference pressure transducer adapted to provide an output signal responsive to and dependent upon the fluid pressure applied to the input of said reference pressure transducer, a microcomputer adapted to be coupled to the reference pressure transducer and to receive the output signal produced by said reference pressure transducer for producing a corrected output signal representing a corrected value of the output signal of the reference pressure transducer and display means coupled to receive the corrected output signal from the microcomputer to display the measured pressure, said microcomputer including means for providing zero corrrection to the output signal to produce a zero corrected signal therefrom, means coupled to receive said zero corrected signal for correcting the gain of said signal and producing a gain corrected signal and means coupled to receive the gain corrected signal for linearizing said gain corrected signal, solenoid control valves for selectively coupling said source of reference pressure, said first and second output ports and said first, second and third input ports to said reference pressure transducer means for testing the accuracy of one or more pressure transducer or measuring the pressure of a test fluid.

* * * * *